United States Patent
Sasaki et al.

(10) Patent No.: US 10,647,303 B2
(45) Date of Patent: May 12, 2020

(54) WASHER LIQUID SUPPLY SYSTEM

(71) Applicant: HONDA MOTOR CO., LTD., Tokyo (JP)

(72) Inventors: Takeshi Sasaki, Wako (JP); Taisuke Goto, Wako (JP); Motoki Minami, Wako (JP); Takuro Hashimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 16/039,397

(22) Filed: Jul. 19, 2018

(65) Prior Publication Data
US 2019/0023231 A1 Jan. 24, 2019

(30) Foreign Application Priority Data
Jul. 20, 2017 (JP) .................... 2017-141309

(51) Int. Cl.
*B60S 1/48* (2006.01)
*F28F 27/02* (2006.01)
*B60S 1/50* (2006.01)
*F24H 9/20* (2006.01)
(Continued)

(52) U.S. Cl.
CPC ............. *B60S 1/481* (2013.01); *B60S 1/487* (2013.01); *B60S 1/50* (2013.01); *F24H 1/009* (2013.01); *F24H 9/2014* (2013.01); *F28F 27/02* (2013.01); *F28D 2020/0069* (2013.01)

(58) Field of Classification Search
None
See application file for complete search history.

(56) References Cited

U.S. PATENT DOCUMENTS 5,522,453 A * 6/1996 Green ................ B60S 1/487
165/154
5,946,763 A 9/1999 Egner-Walter et al.
(Continued)

FOREIGN PATENT DOCUMENTS

GB 1417467 A * 12/1975 ............ B60N 3/16
JP S58-53549 A 3/1983
(Continued)

OTHER PUBLICATIONS

Japanese Office Action (English translation) dated May 28, 2019, 3 pages.

*Primary Examiner* — Cristi J Tate-Sims
(74) *Attorney, Agent, or Firm* — Rankin, Hill & Clark LLP

(57) ABSTRACT

A washer liquid supply system is disclosed which includes: a washer tank mounted on a vehicle to store washer liquid; a supply section mounted on the vehicle to supply the washer liquid in the washer tank to an object of the vehicle; a heat-retaining tank mounted on the vehicle and disposed between the washer tank and the supply section to temporarily store the washer liquid supplied from the washer tank to the supply section; a delivering section mounted on the vehicle to deliver the washer liquid stored in the washer tank to the supply section through the heat-retaining tank; and a control section that controls the delivering section, wherein the control section controls the delivering section to temporarily increase a delivering amount of the washer liquid at an initial time of supplying the washer liquid.

9 Claims, 14 Drawing Sheets

(51) Int. Cl.
 *F24H 1/00* (2006.01)
 *F28D 20/00* (2006.01)

(56) References Cited

U.S. PATENT DOCUMENTS

| | | | | |
|---|---|---|---|---|
| 6,133,546 A | * | 10/2000 | Bains | B60S 1/488 |
| | | | | 219/202 |
| 2012/0174333 A1 | * | 7/2012 | Heidacker | B60S 1/487 |
| | | | | 15/250.01 |
| 2012/0183281 A1 | | 7/2012 | Sato et al. | |
| 2012/0192959 A1 | | 8/2012 | Wein et al. | |
| 2014/0352095 A1 | * | 12/2014 | Caillot | B60S 1/482 |
| | | | | 15/250.01 |
| 2014/0367488 A1 | | 12/2014 | Dominique et al. | |
| 2017/0334408 A1 | * | 11/2017 | Sato | B60S 1/50 |
| 2018/0162327 A1 | * | 6/2018 | Lansinger | F28F 9/0246 |

FOREIGN PATENT DOCUMENTS

| | | |
|---|---|---|
| JP | S58-28938 Y2 | 6/1983 |
| JP | S62-185669 U | 11/1987 |
| JP | H02-070557 A | 3/1990 |
| JP | H10-512207 A | 11/1998 |
| JP | 2007-161004 A | 6/2007 |
| JP | 2008-238953 A | 10/2008 |
| JP | 2009-516616 A | 4/2009 |
| JP | 2012-144194 A | 8/2012 |
| JP | 2015-140111 A | 8/2015 |
| JP | 2016-078489 A | 5/2016 |
| KR | 20060089349 A | 8/2006 |

* cited by examiner

WASHER LIQUID SUPPLY SYSTEM

CROSS REFERENCE TO RELATED APPLICATION

This application claims the priority of Japanese Patent Application No. 2017-141309, filed on Jul. 20, 2017 in the Japan Patent Office, the entire specification, claims and drawings of which are incorporated herewith by reference.

BACKGROUND OF THE INVENTION

Field of the Invention

The present invention relates to a system for supplying washer liquid to an object of a vehicle.

Description of the Related Art

In Patent Document 1 (Japanese Examined Utility Model Application Publication No. JP5536680), disclosed is ejection of a washer liquid toward the floor surface of a vehicle, the washer liquid having been prepared by mixing, in a pipe, a washer liquid supplied from a washer liquid tank and compressed air supplied from a compressor to thereby turn the mixture into an emulsion state with bubbles in it.

SUMMARY OF THE INVENTION

An aspect of the present invention provides a washer liquid supply system, comprising:
a washer tank mounted on a vehicle to store washer liquid;
a supply section mounted on the vehicle to supply the washer liquid in the washer tank to an object of the vehicle;
a heat-retaining tank mounted on the vehicle and disposed between the washer tank and the supply section to temporarily store the washer liquid supplied from the washer tank to the supply section;
a delivering section mounted on the vehicle to deliver the washer liquid stored in the washer tank to the supply section through the heat-retaining tank; and
a control section that controls the delivering section, wherein the control section controls the delivering section to temporarily increase a delivering amount of the washer liquid at an initial time of supplying the washer liquid.

PREFERRED EMBODIMENTS OF THE INVENTION

Figure 1:
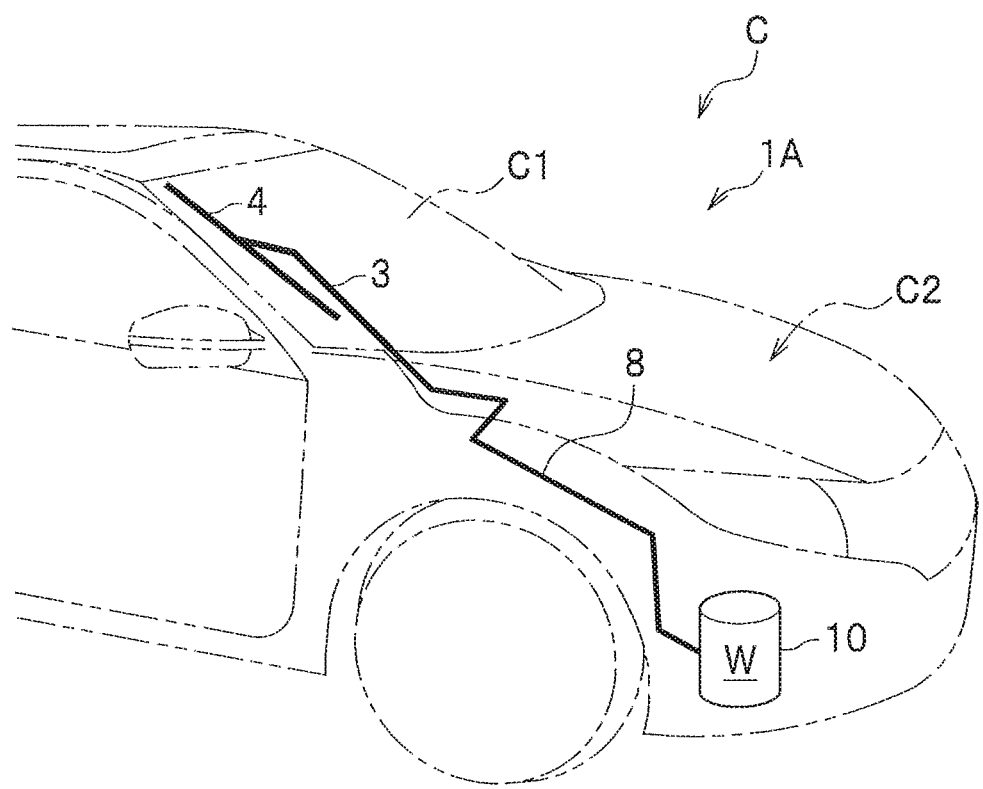
FIG. 1 is a schematic perspective view showing a vehicle to which a washer liquid supply system according to a first embodiment of the present invention is applied.

Prior to describing embodiments of the present invention, prior art is argued below.

In the art described in Patent Document 1, an upper end of a flow pipe for discharging the washer liquid from the heat-retaining tank is disposed at a position higher than the bottom surface of the tank of the heat-retained tank. Accordingly, when an liquid amount of the washer liquid in the heat-retain tank decreases, the washer liquid cannot be ejected until the level of the washer liquid reaches the upper end of the flow pipe.

The present invention has been developed in this situation, and an object of the present invention is to provide a washer liquid supply system in a simple structure and capable of quick ejection of the washer liquid.

According to the present invention, it is possible to supply the washer liquid to an object of a vehicle.

Hereinafter, washer liquid supply systems according to embodiments of the present invention will be described in detail, referring to the drawings and taking examples of a case that washer liquid is supplied to a window panel as an object of washing. In the description below, the same symbols will be given to the respective same elements, and overlapping description will be omitted.

First Embodiment

Figure 2:
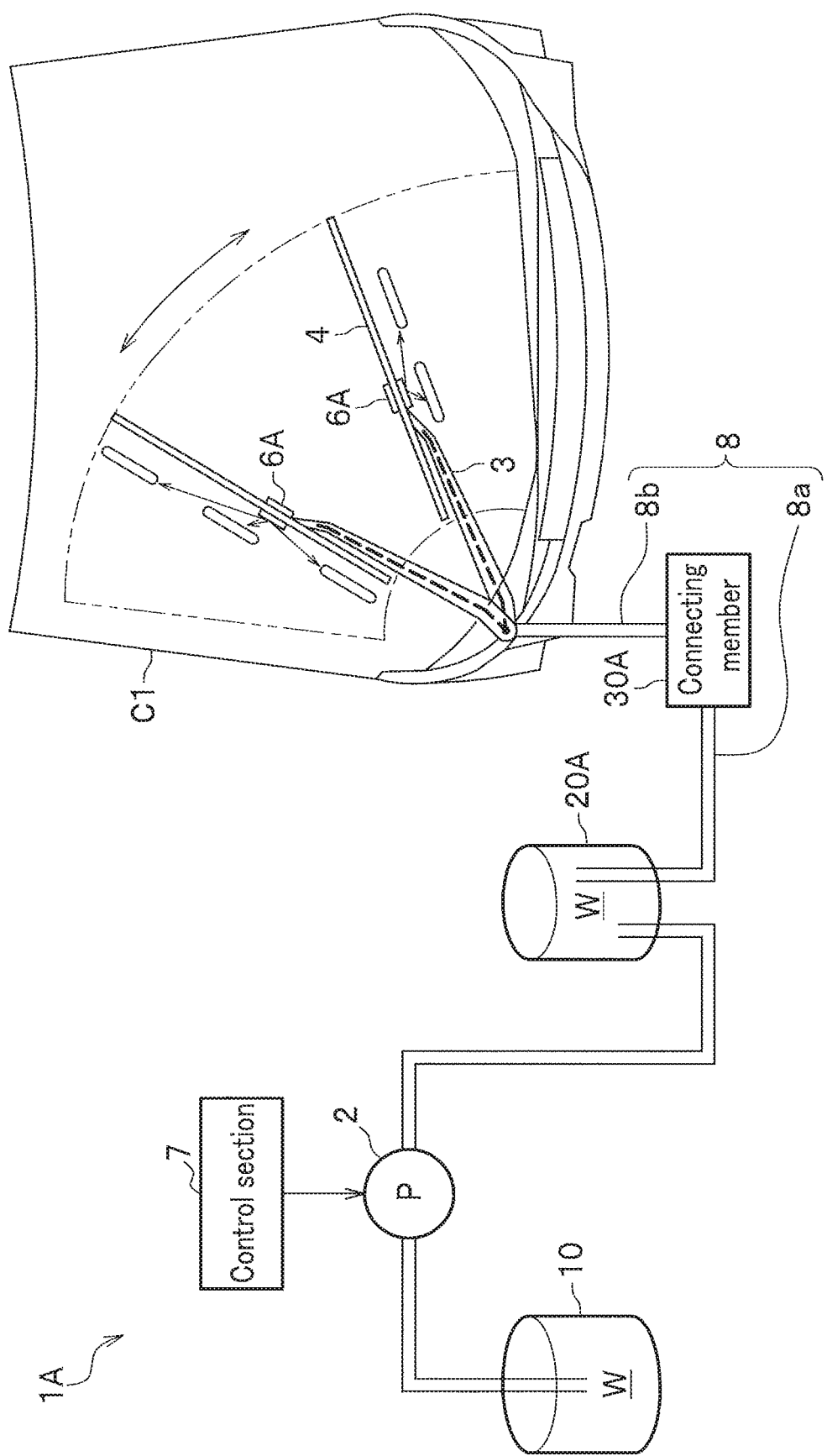
FIG. 2 is a schematic view showing the washer liquid supply system according to the first embodiment of the present invention.

As shown in FIG. 1 and FIG. 2, a washer liquid supply system 1A according to a first embodiment of the present invention is a system that supplies a washer liquid W to a window shield C1, which is the front glass of a Vehicle C. The washer liquid W contains water, alcohol and the like to operate as an anti-freeze liquid. The washer liquid supply system 1A includes a washer tank 10, a pump (delivering section) 2, a heat-retaining tank (heating section) 20A, a connecting member 30A, a wiper arm 3, a wiper blade 4, a supply section 6A, and a control section 7. The washer tank 10, the heat-retaining tank 20A, the connecting member 30A, and the supply section 6A are serially connected by a passage section 8 through which the washer liquid W can flow. The passage section 8 is formed by a flexible tube and the like.

Washer Tank

Figure 3:
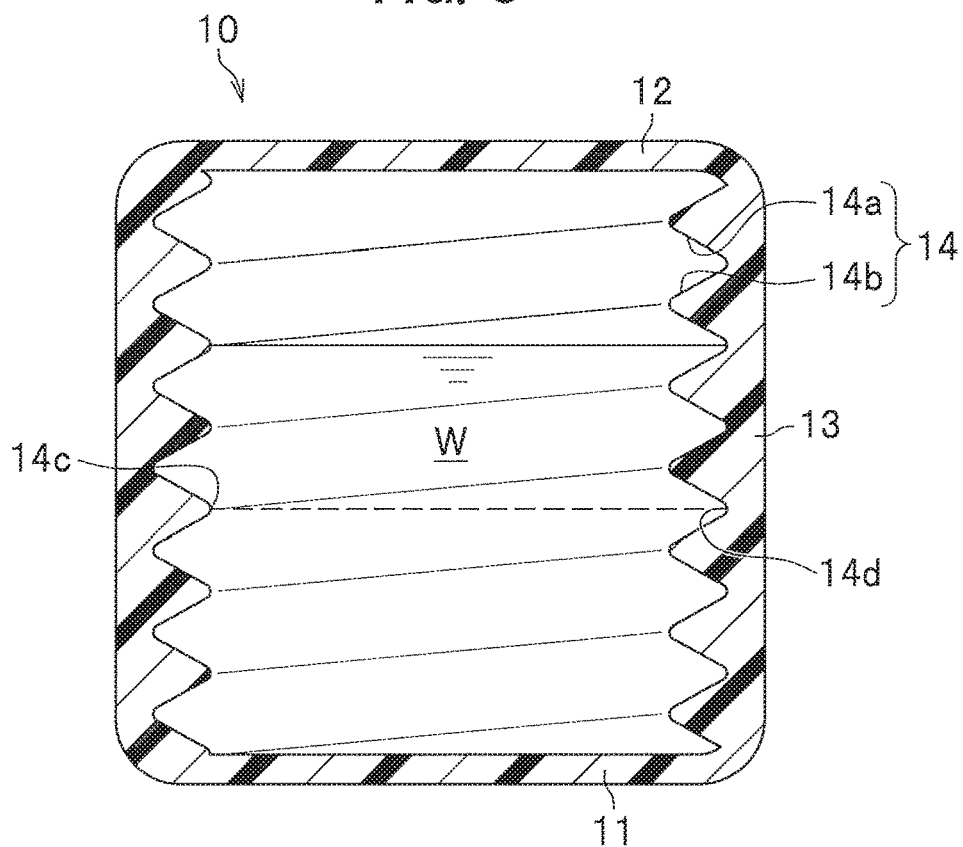
FIG. 3 is a schematic cross-sectional view showing a washer tank according to the first embodiment of the present invention.

As shown in FIG. 3, the washer tank 10 is installed in a power source chamber C2 arranged at a front part of a vehicle C, and stores the washer liquid W. The washer liquid W stored in the washer tank 10 flows through the passage section 8 (see FIG. 1) to the outside of the washer tank 10 and is delivered to the supply section 6A. The washer tank 10 is a resin member in a bottomed cylindrical shape, and is integrally provided with a bottom wall portion 11, an upper wall portion 12, both having a circular shape in a plan view, and a side wall portion 13, which has an annular shape in a plan view and is extended vertically such as to connect the circumferential marginal portions of the bottom wall portion 11 and the upper wall portion 12. The inner circumferential surface of the side wall portion 13 is provided with a groove portion 14.

Groove Portion, First Inclined Portion, and Second Inclined Portion

The groove portion 14 is in a spiral shape with a center on the axial line of the washer tank 10 and includes a first inclined portion 14a and a second inclined portion 14b. The first inclined portion 14a is a surface inclined the more inward in the radial direction of the washer tank 10 as a point on the surface is located the more upward. The second inclined portion 14b is a surface inclined the more inward in the radial direction of the washer tank 10 as a point on the surface is located the more downward. The first inclined portion 14a and the second inclined portion 14b are arranged such as to continuously and alternately appear in the height direction. In other words, the first inclined portion 14a on the lower side and the second inclined portion 14b on the upper side, which are continuous, form convex portions protruding inward in the radial direction of the washer tank 10. Further, the first inclined portion 14a on the upper side and the second inclined portion 14b on the lower side, which are continuous, form concave portions recessed outward in the radial direction of the washer tank 10. The convex portions and the concave portions in a cross-sectional view are in triangle shapes. Herein, at each same height on the side wall portion 13 of the washer tank 10, an apex 14d of a concave portion of the groove portion 14 is provided at a part facing an apex 14c of a convex portion of the groove portion 14.

Generation of Babbles in Washer Tank

Figure 4:
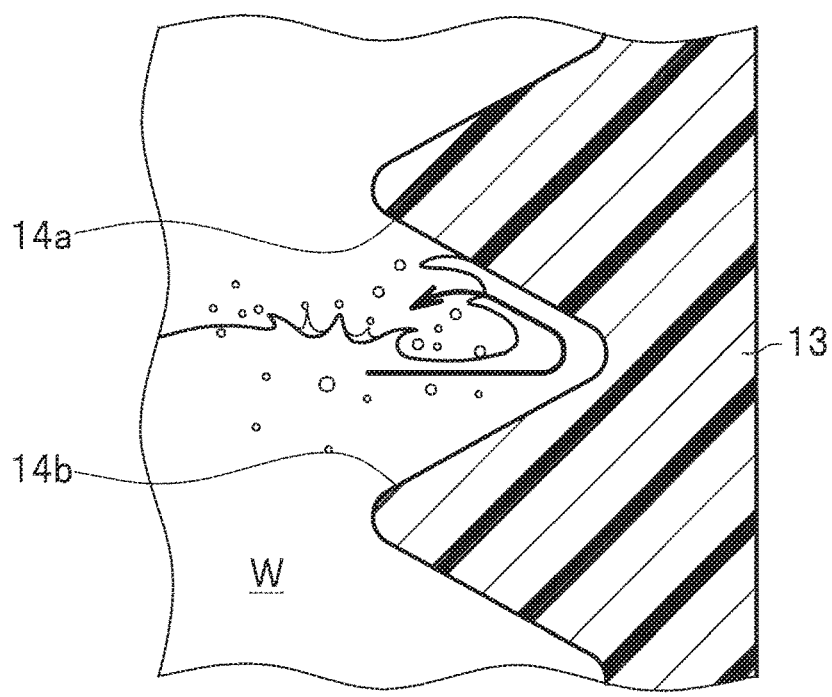
FIG. 4 is an enlarged view of a part in FIG. 3.

In this washer tank 10, the liquid surface of the washer liquid W, which is stored inside, is moved up and down by vibration accompanying the running of the vehicle C and the like. As shown in FIG. 4, the washer liquid W adjacent to the liquid surface is lifted by the second inclined portion 14b and then bounced by the first inclined portion 14a, to become liquid drops and drop down onto the liquid surface of the washer liquid W. Thus, bubbles are generated in the washer liquid W.

Pump

As shown in FIG. 1 and FIG. 2, the pump 2 generates a flow for delivering the washer liquid W, which is stored in the washer tank 10, to the supply section 6A through the heat-retaining tank 20A. In the present embodiment, the pump 2 is arranged between the washer tank 10 and the heat-retaining tank 20A in the passage section 8.

Heat-Retaining Tank

Figure 5:
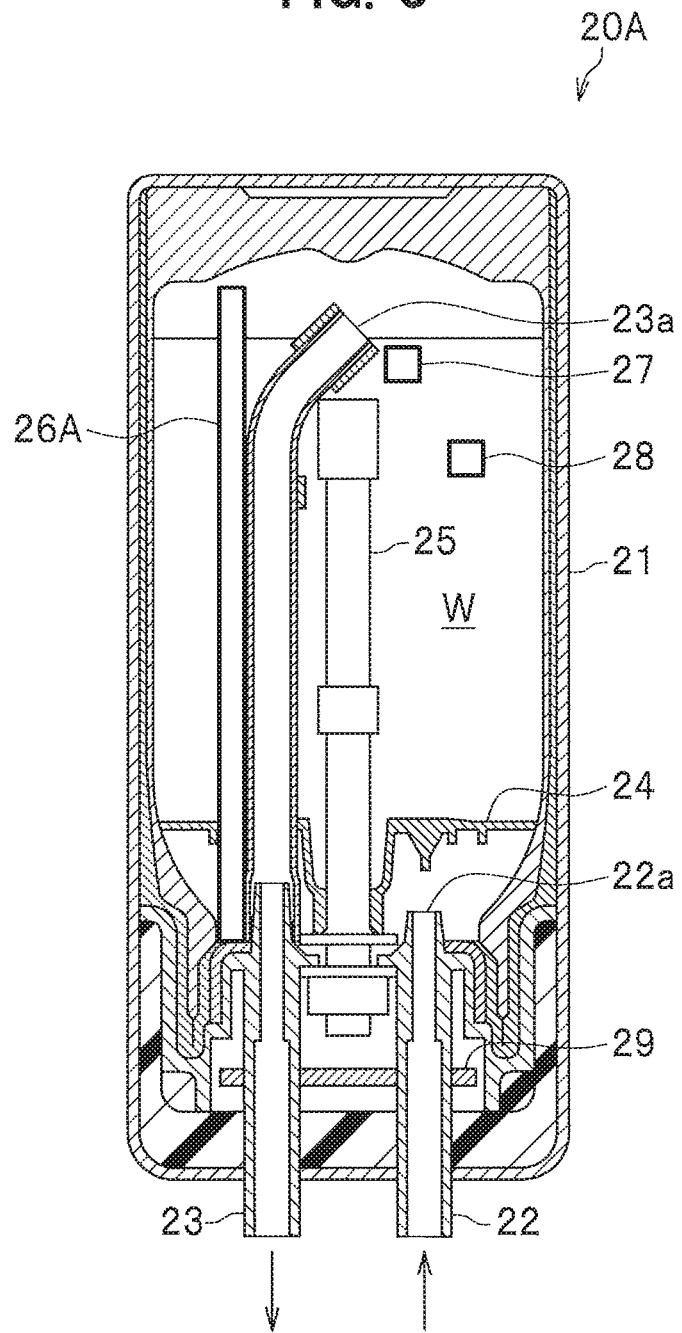
FIG. 5 is a schematic cross-sectional view of a keep-warm tank according to the first embodiment of the present invention.
Figure 6:
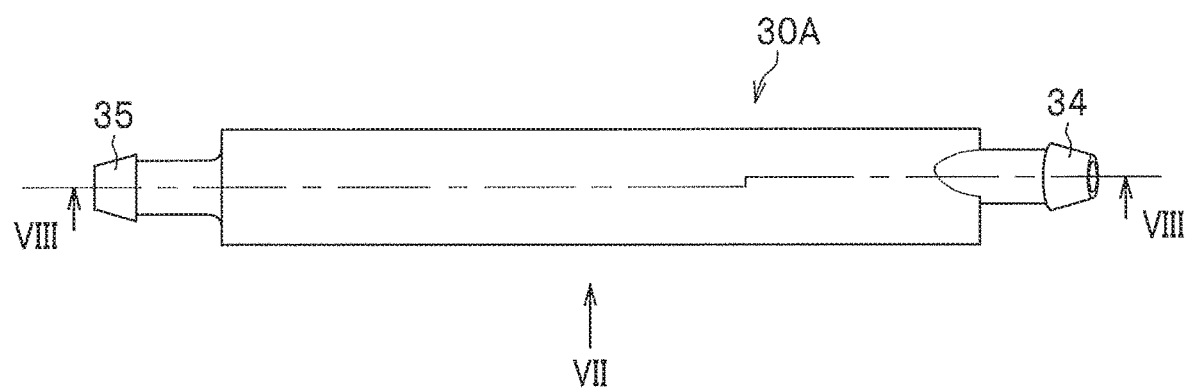
FIG. 6 is a schematic external view of a connecting member according to the first embodiment of the present invention.
Figure 7:
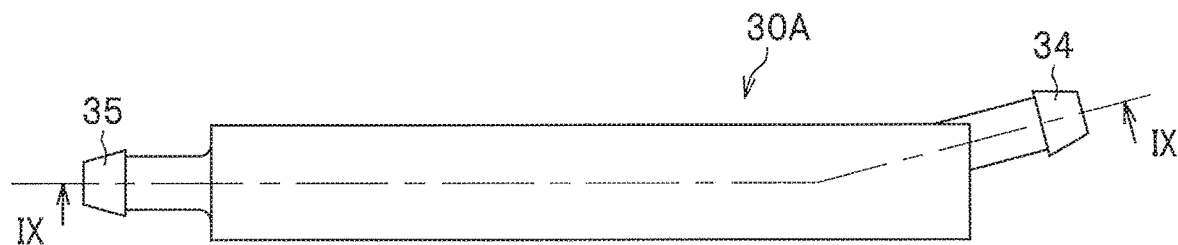
FIG. 7 is an external view of the connecting member in FIG. 6, in a view from direction VII.

The heat-retaining tank 20A is arranged between the washer tank 10 and the supply section 6A, and temporarily stores the washer liquid W, which is delivered from the washer tank 10 to the supply section 6A. The heat-retaining tank 20A has a heating function to heat the washer liquid W temporarily stored in the heat-retaining tank 20A itself, and a heat-retaining function to maintain the temperature of the heated washer liquid W. By the heating function and the heat-retaining function, the heat-retaining tank 20A improves the washing capacity of the washer liquid W stored in the heat-retaining tank 20A itself and makes the washer liquid W have a defrosting function. In other words, the heat-retaining tank 20A also serves as a heating section for heating the washer liquid W. As shown in FIG. 5, the heat-retaining tank 20A is provided with a tank main-body 21, an inlet-side passage section 22, a discharge-side passage section 23, a deflector 24, a heater 25, a liquid-amount detecting section 26A, an alcohol-concentration detecting section 27, a liquid-temperature detecting section 28, and a control board (control section) 29.

Tank Main-Body

The tank main-body 21 is a resin or metal tank in which the washer liquid W is temporarily stored. The tank main-body 21 is, for example, made from a foam material, or for example, has a bilayer structure containing air, and thus has a heat-retaining function to maintain the temperature of the washer liquid W therein.

Inlet-Side Passage Section and Discharge-Side Passage Section

The inlet-side passage section 22 lets the washer liquid W, which has been delivered from the washer tank 10, flow into the tank main-body 21. The discharge-side passage section 23 lets the washer liquid W, which is in the tank main-body 21, flow out to the supply section 6A side. The respective passage sections 22 and 23 are formed by a tube or the like, and are inserted from the bottom wall portion of the tank main-body 21 into the tank main-body 21.

An opening 23a of the discharge-side passage section 23 is arranged at a position higher than an opening 22a of the inlet-side passage section 22. That is, when the liquid surface of the washer liquid W, which has been delivered into the tank main-body 21 by the pump 2, has become higher than the opening 23a of the discharge-side passage section 23, the washer liquid W in the tank main-body 21 is delivered from the discharge-side passage section 23 to the supply section 6A side. Further, in the tank main-body 21, a space, in consideration of the expansion of the washer liquid W, is arranged on the upper side of the opening 23a of the discharge-side passage section 23.

Deflector

In the tank main-body 21, the deflector 24 is disposed at a position higher than the opening 22a of the inlet-side passage section 22, lower than the opening 23a of the discharge-side passage section 23, and facing the opening 22a of the inlet-side passage section 22.

Heater

The heater 25 is arranged in the tank main-body 21 as a heating section main-body for heating the washer liquid W, which is temporarily stored in the tank main-body 21.

Liquid-Amount Detecting Section

The liquid-amount detecting section 26A is arranged in the tank main-body 21 to detect the liquid amount of the washer liquid W temporarily stored in the tank main-body 21. In the present embodiment, the liquid-amount detecting section 26A is a level sensor for detecting the liquid surface of the washer liquid W temporarily stored in the tank main-body 21. The liquid-amount detecting section 26A outputs a detection result to the control section 7 (see FIG. 2).

Alcohol-Concentration Detecting Section

The alcohol-concentration detecting section 27 is arranged in the tank main-body 21 to detect the alcohol concentration of the washer liquid W, which is temporarily stored in the tank main-body 21. The alcohol-concentration detecting section 27 supplies a detection result to a control board 29. In the present embodiment, the alcohol-concentration detecting section 27 detects the alcohol concentration of the washer liquid W at a position closer to the opening 23a of the discharge-side passage section 23 than to the opening 22a of the inlet-side passage section 22.

Liquid-Temperature Detecting Section

The liquid-temperature detecting section 28 is arranged in the tank main-body 21 to detect the temperature (liquid temperature) of the washer liquid W, which is temporarily stored in the tank main-body 21. The liquid-temperature detecting section 28 outputs a detection result to the control board 29.

Control Board

Based on a detection result from the alcohol-concentration detecting section 27, the control board 29 controls the heater 25 to make the liquid temperature, which is detected by the liquid-temperature detecting section 28, close to a preset target temperature. A method of controlling the heater 25 by the control board 29 will be described later.

Connecting Member

As shown in FIG. 1 and FIG. 2, the connecting member 30A is arranged between the washer tank 10 and the supply section 6A, and in more detail between the heat-retaining tank 20A and the supply section 6A. The connecting member 30A is a bubbling section for making the washer liquid W, which flows through the connecting member 30A, contain bubbles. As shown in FIG. 6 through FIG. 9, the connecting member 30A is a metal member in a cylindrical shape. The connecting member 30A is provided with an inlet passage section 31, a connecting passage section 32, and a discharge passage section 33 in this order from the upstream side. A flexible first tube 8a is connected to the upstream-side end portion of the connecting member 30A, and a flexible second tube 8b is connected to the downstream-side end portion of the connecting member 30A. Herein, the first tube 8a forms at least a part of a first passage section, which connects the washer tank 10 (the heat-retaining tank 20A in the present embodiment) and the connecting member 30A. The second tube 8b forms at least a part of a second passage section that connects the supply section 6A and the connecting member 30A.

The inlet passage portion 31 is a passage through which the washer liquid W from the upstream side flows. The upstream end of the inlet passage section 31 is an inlet section 31a to which the first tube (the first passage section) 8a is connected.

The connecting passage section 32 is a passage through which the washer liquid W from the inlet passage section 31 flows. In the order from the upstream side, the connecting passage section 32 is provided with a large diameter portion 32a, a diameter-shrinking portion 32b whose diameter and passage cross-sectional area become smaller as the position of the passage cross-section goes toward the downstream side, a throttle section 32c, a diameter-expanding portion 32d whose diameter and passage cross-sectional area become larger as the position of the passage cross-section goes toward the downstream side, a small diameter portion 32e whose passage cross-sectional area is smaller than the large diameter portion 32a, and a diameter-shrinking portion 32f whose diameter and passage cross-sectional area become smaller as the position of the passage cross-section goes toward the downstream side. The passage cross-sectional area, on the upstream side, of the diameter-shrinking portion 32b is equal to the passage cross-sectional area of the large diameter portion 32a. The passage cross-sectional area of the downstream-side end portion of the diameter-shrinking portion 32b and the passage cross-sectional area of the upstream-side end portion of the diameter-expanding portion 32d are equal to the passage cross-sectional area of the throttle section 32c. The passage cross-sectional area of the downstream-side end portion of the diameter-expanding portion 32d, and the passage cross-sectional area of the upstream-side end portion of the diameter-shrinking portion 32f, are equal to the passage cross-sectional area of the small diameter portion 32e. The passage cross-sectional sectional area of the downstream-side end portion of the diameter-shrinking portion 32f is equal to the passage cross-sectional area of the discharge passage section 33. The passage length of the diameter-shrinking portion 32b is smaller than the passage length of the diameter-expanding portion 32d.

The discharge passage section 33 is a passage through which the washer liquid W from the connecting passage section 32 flows. The downstream end of the discharge passage section 33 is a discharge section 33a to which the second tube (the second passage section) 8b is connected. The passage cross-sectional area of the discharge passage section 33 is equal to the passage cross-sectional area of the inlet passage section 31, and is smaller than the passage cross-sectional area of the large diameter portion 32a and the passage cross-sectional area of the small diameter portion 32e.

Regarding the connecting member 30A, the part at which the inlet passage section 31 is formed is a first fit-engagement section 34 to which the first tube 8a is fit-engaged (outer fitting). In other words, the inlet section 31a is formed at the first fit-engagement section 34. In the connecting member 30A, the part at which the discharge passage section 33 is formed is a second fit-engagement section 35 to which the second tube 8b is fit-engaged (outer fitting). In other words, the discharge section 33a is formed at the second fit-engagement section 35.

Figure 8:
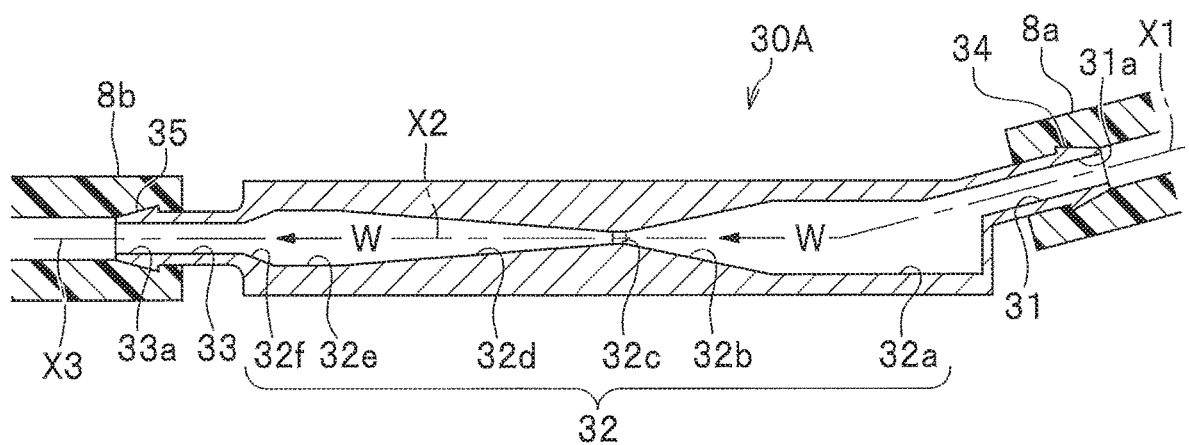
FIG. 8 is a cross-sectional view taken along line VIII-VIII in FIG. 6.
Figure 9:
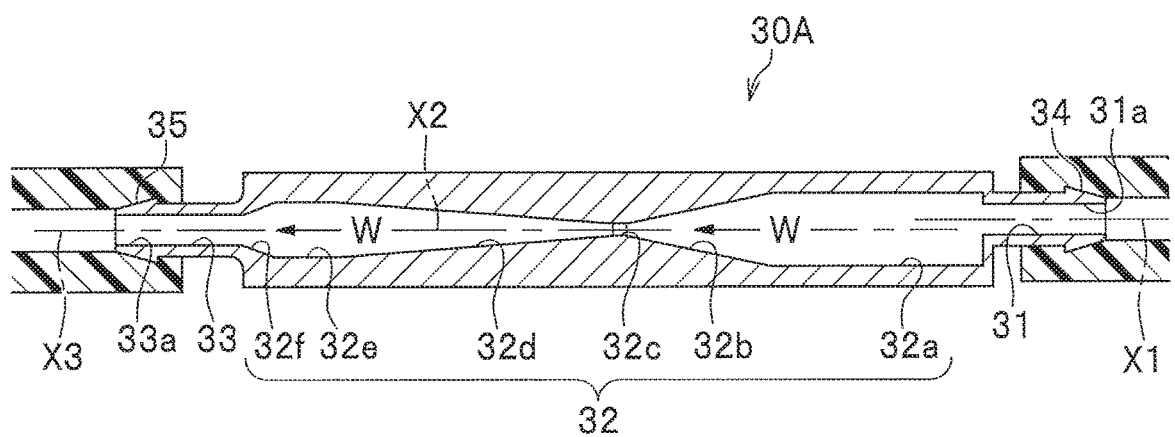
FIG. 9 is a cross-sectional view taken along line IX-IX in FIG. 7.

The inlet passage section 31, which is the passage section in the first fit-engagement section 34, extends in a direction intersecting with the connecting passage section 32. The discharge passage section 33, which is the passage section in the second fit-engagement section 35, extends colinearly with the connecting passage section 32. That is, as shown in FIG. 8, in a plan view for example, a passage center line X1 of the inlet passage section 31 intersects with a passage center line X2 of the connecting passage section 32. A passage center line X3 of the discharge passage section 33 is arranged colinearly with the passage center line X2 of the connecting passage section 32. As shown in FIG. 9, in a side view for example, the passage center line X1 of the inlet passage section 31 is shifted in parallel from the passage center line X2 of the connecting passage section 32.

Bubble Generation in Connecting Member

Figure 10:
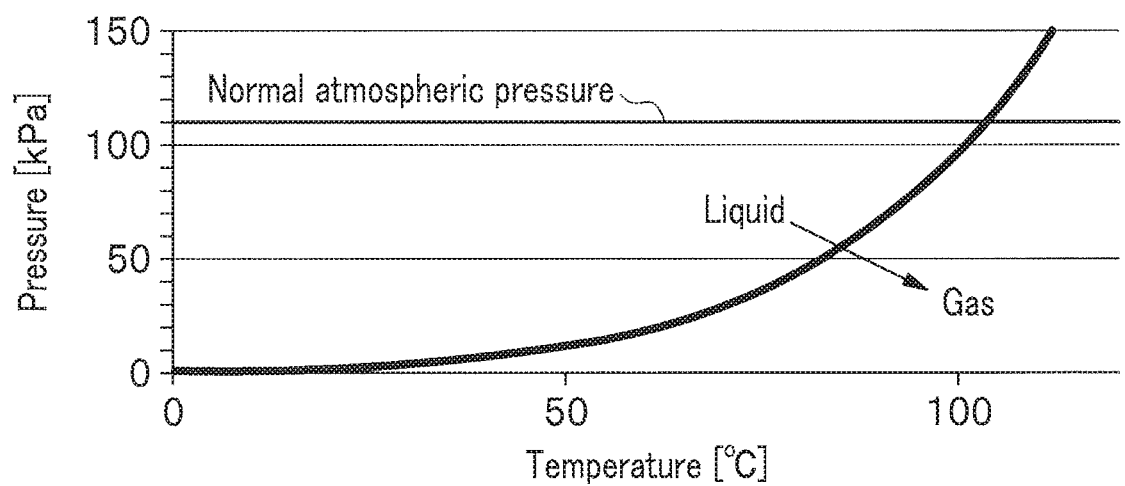
FIG. 10 is a graph showing a saturated vapor pressure curve of water.

As shown in FIG. 10, when the state of water changes from the liquid side to the gas side of the saturated vapor pressure curve, the water generates cavitation. Further, the higher the liquid temperature of the washer liquid W, at the higher pressure the washer liquid W turns into gas, and the easier it is for the washer liquid W to generate cavitation. As shown in FIG. 6 through FIG. 9, in the above-described connecting member 30A, the throttle section 32c increases the flow velocity of the washer liquid W to thereby decrease the liquid pressure, deposit air, which is dissolved in the liquid, and generate bubbles in the washer liquid W. On the other hand, the diameter-expanding portion 32d decreases the flow velocity of the washer liquid W to thereby increase the liquid pressure, make the bubbles in the washer liquid W micro valves, and thus agitate the washer liquid W.

Further, when the washer liquid W flows from the inlet passage section 31 to the connecting passage section 32, the flow turns into a swirling flow to thereby efficiently generate bubbles.

Wiper Arm and Wiper Blade

As shown in FIG. 1 and FIG. 2, the root end portion of the wiper arm 3 is swingably supported at the lower end portion of the window shield C1. The wiper blade 4 is used to wipe the window shield C1. The middle portion, in the width direction, of the wiper blade 4 is supported rotatably at the tip end portion of the wiper arm 3.

Supply Section

Figure 11:
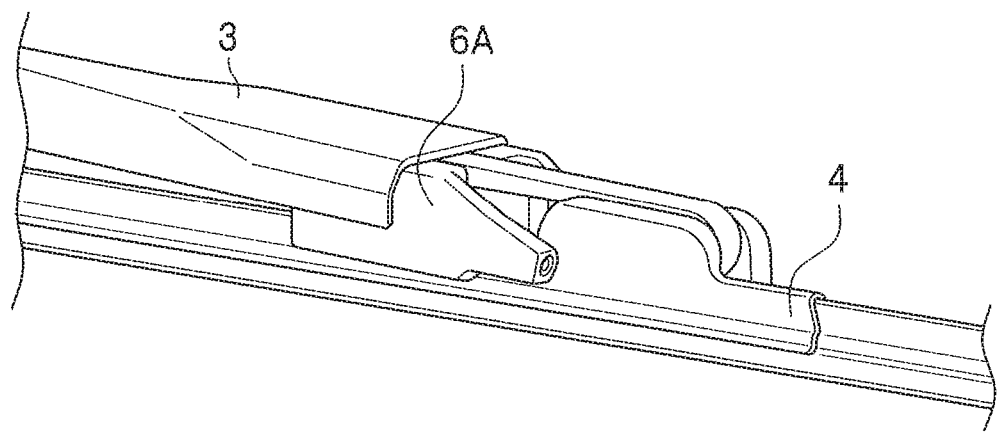
FIG. 11 is a schematic perspective view showing a wiper arm, a wiper blade, and a supply section.

The supply section 6A is a component of the object-side end portion of the washer liquid supply system 1A, and is arranged to discharge and supply the washer liquid W, which has been delivered from the washer tank 10, to the window shield C1. The supply section 6A is installed integrally with the wiper arm 3 or the wiper blade 4. As shown in FIG. 11, the supply section 6A in the present embodiment is arranged integrally with the tip end portion of the wiper arm 3, and has a function as a nozzle that ejects the washer liquid W in the wiping range of the wiper arm 3.

Control Section

The control section 7 includes a CPU (Central Processing Unit), a ROM (Read Only Memory), a RAM (Random Access Memory), an input-output circuit, and the like. The control section 7 controls a pump 20, based on detection results from the liquid-amount detecting section 26A and the alcohol-concentration detecting section 27.

Control of Increase in Initial Eject Amount

Figure 12A:
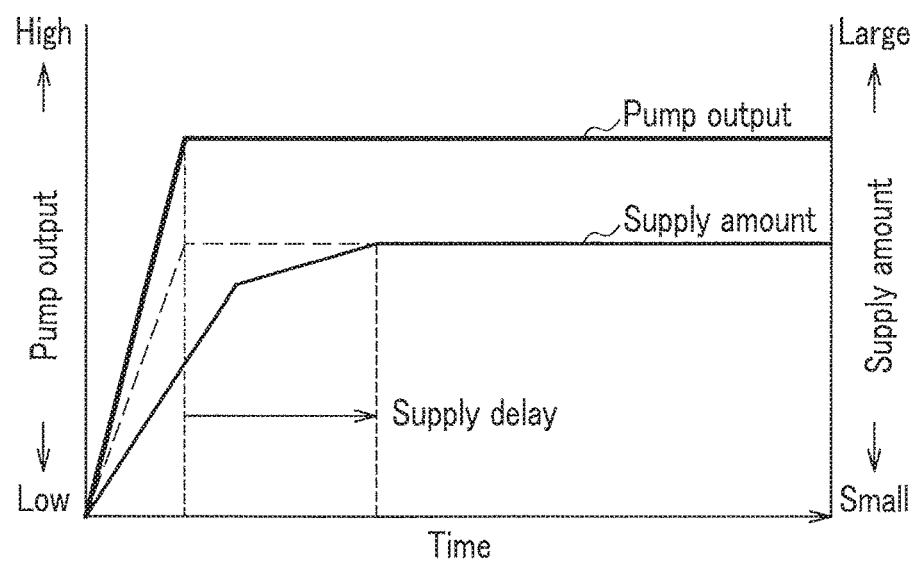
FIGS. 12A to 12C are graphs showing examples of temporal changes of the pump output and of the supply amount of washer liquid to a window panel.

When a driver of the vehicle C operates an operating section (not shown), the control section 7 drives the pump 2 to thereby supply the washer liquid W to the window shield C1. Herein, if a state that the washer liquid W is not supplied has lasted for a long time or the like, water in the washer liquid W evaporates or alcohol in the washer liquid W volatilizes in the tank main-body 21 of the heat-retaining tank 20A, and thus the liquid surface of the washer liquid W becomes lower than the opening 23a of the discharge-side passage section 23. In this event, if it is attempted to supply the washer liquid W to the window shield C1, the time taken until the liquid surface of the washer liquid W reaches the opening 23a of the discharge-side passage section 23 becomes delay of supply of the washer liquid W to the window shield C1 (see FIG. 12A).

Accordingly, in the initial supply of the washer liquid W, the delay of supply is reduced by increasing the output of the pump 2.

In the present embodiment, based on a detection result from the liquid-amount detecting section 26A, the control section 7 sets an increase amount for temporarily increasing the delivering amount (the delivering amount per unit time of the washer liquid W).

Figure 12B:
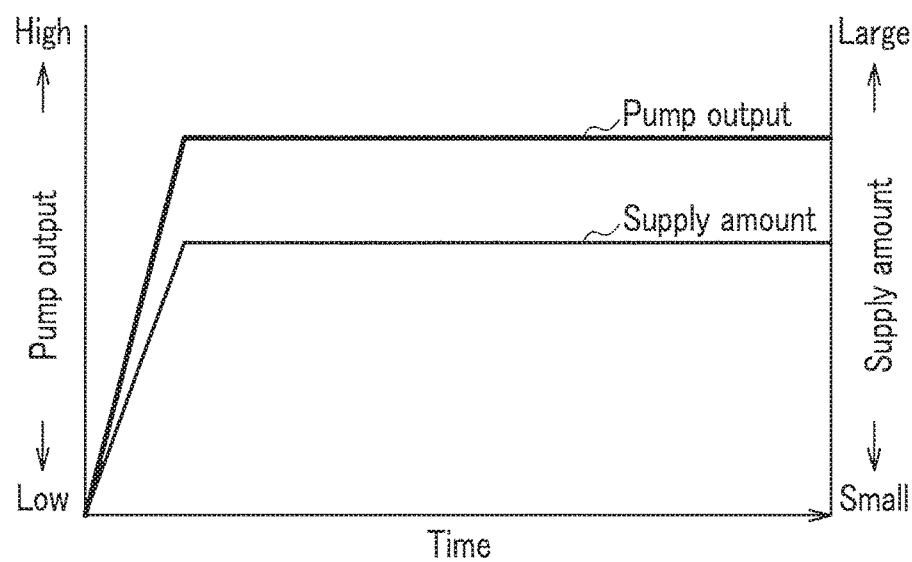

Herein, if the detection result from the liquid-amount detecting section 26A indicates that the liquid surface level of the washer liquid W is higher than or equal to the height of the opening 23a of the discharge-side passage section 23, the control section 7 sets the increase amount of the delivering amount (namely the increase amount a of the output of the pump 2) to zero (see FIG. 12B).

Figure 12C:
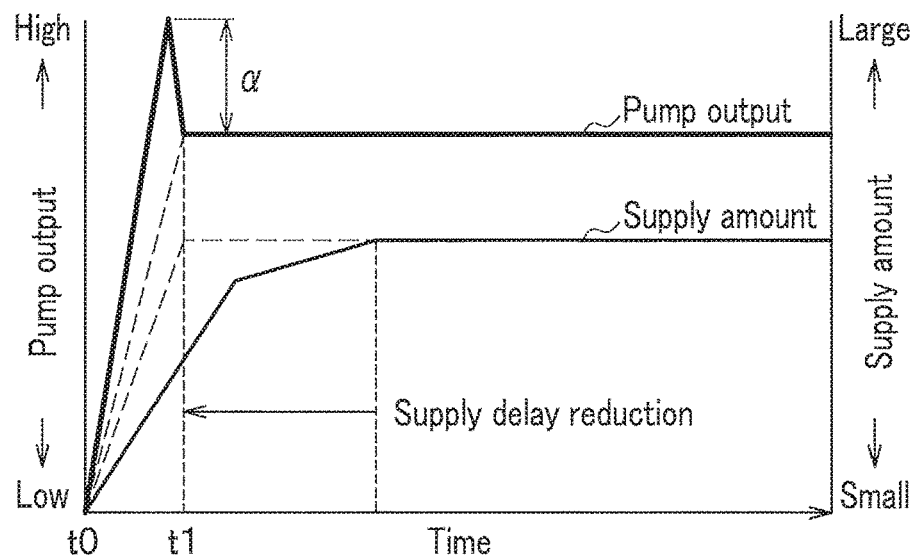

If the detection result from the liquid-amount detecting section 26A indicates that the liquid surface level of the washer liquid W is lower than the height of the opening 23a of the discharge-side passage section 23, the control section 7 sets an increase amount (see FIG. 12C).

Herein, the lower the liquid surface level of the washer liquid W from the height of the opening 23a is, the larger the increase amount can be set.

In such a manner, when a detection result from the liquid-amount detecting section 26A indicates that the liquid surface level of the washer liquid W is lower than the height of the opening 23a of the discharge-side passage section 23, the control section 7 increases the output of the pump 2 from time $t_0$ (control start time of the pump 2), which is the initial time of supplying the washer liquid W to the window shield C1 to predetermined time $t_1$ by $\alpha$, compared with the output of the pump 2 at time $t_1$ and after. From the time $t_1$, the control section 7 drives the pump 2 by a predetermined output. Herein, the predetermined time $t_0$-$t_1$ can be set, based on the time (see FIG. 12B) taken from supply start of the washer liquid W until the supply amount of the washer liquid W reaches a predetermined value in a case that there is no supply delay.

Incidentally, the control section 7 can set the increase amount a and the increase time $t_0$-$t_1$ such that the lower the liquid surface level of the washer liquid W from the height of the opening 23a is, the larger the increase amount is and the longer the increase time $t_0$-$t_1$ is.

Heating Control Corresponding to Alcohol Concentration

When the washer liquid W stored in the tank main-body 21 of the heat-retaining tank 20A is heated by the heater 25, volatilization of the alcohol contained in the washer liquid W progresses, and the alcohol concentration of the washer liquid W decreases. If heating by the heater is stopped in such a state that the alcohol concentration of the washer liquid W has decreased, the washer liquid W sometimes freezes by atmospheric temperature.

Figure 13:
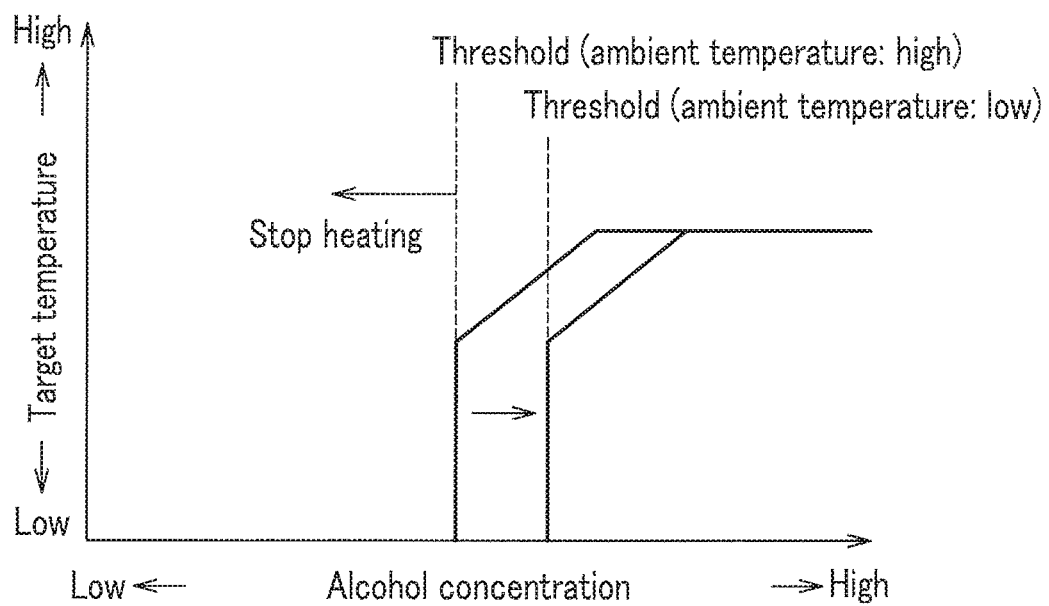
FIG. 13 is a graph showing an example of the relation between the alcohol concentration and the target temperature of the washer liquid in the keep-warm tank.

Accordingly, the control board 29 controls the heater 25, based on a detection result from the alcohol-concentration detecting section 27. In detail, when the alcohol concentration detected by the alcohol-concentration detecting section 27 is lower than or equal to a preset threshold, the control board 29 stops heating by the heater 25 (FIG. 13). In other words, during heating by the heater 25, when the alcohol concentration detected by the alcohol-concentration detecting section 27 has become equal to or lower than the preset threshold, the control board 29 stops heating of the washer liquid W by the heater 25. Even if conditions for start of heating by the heater 25 are satisfied in a stop state of the heater 25, the control board 29 does not perform heating of the washer liquid W by the heater 25.

Further, based on the detection result from the alcohol-concentration detecting section 27, the control board 29 sets a target temperature (heating target temperature) of the washer liquid W by the heater 25. In detail, if the alcohol concentration is higher than or equal to the threshold, the higher the alcohol concentration is, the higher the control board 29 sets the target temperature of the washer liquid W (see FIG. 13).

As the washer tank 10 according to the first embodiment of the invention is provided with the first inclined portion 14a, it is possible to make the washer liquid W contain bubbles by vibration of the vehicle C, without providing a special mechanism such as a compressor or the like.

Further, as the washer tank 10 is provided with the second inclined portion 14b, it is possible to lift the liquid surface of the washer liquid W by the vibration of the vehicle C up to the first inclined portion 14a to thereby make the washer liquid W satisfactorily contain bubbles.

Still further, as the washer tank 10 is provided with plural first inclined portions 14a arrayed vertically, even if the liquid amount of the stored washer liquid W varies, it is possible to make the washer liquid W contain bubbles by the first inclined portion 14a at a position corresponding to the liquid surface of the washer liquid W.

Still further, as the washer tank 10 is provided with the first inclined portions 14a and the second inclined portions 14b formed by the groove portion 14 in a spiral shape, the washer tank 10 can be easily manufactured.

Yet further, in the washer tank 10, as the first inclined portions 14a are formed by the groove portion 14 in a spiral shape, even if the liquid amount of the washer liquid W varies, a first inclined portion 14a and a second inclined portion 14b exist at a position corresponding to the liquid surface of the washer liquid W, which makes it possible to make the washer liquid W satisfactorily contain bubbles by the vibration of the vehicle C.

Further, in the washer tank 10, the apex 14c of a convex portion and the apex 14d of a concave portion of the groove portion 14 face each other at the same height. Accordingly, it is possible to make the inner shape of the washer tank 10 the same at all height positions, and make the washer liquid W satisfactorily contain bubbles.

In the washer liquid supply system 1A according to the first embodiment of the invention, as the connecting member 30A (bubbling section) makes the washer liquid W contain bubbles, it is possible to make the washer liquid W contain bubbles by a simple structure in which the bubbling section is mounted on the vehicle C, and improve the capacity of washing the window shield C1.

Further, in the washer liquid supply system 1A, as the connecting member 30A is arranged at the passage section 8, it is possible to improve the capacity of washing the window shield C1, with a simple structure.

Still further, in the washer liquid supply system 1A, as the connecting member 30A, which connects the first tube (the first passage section) 8a and the second tube (the second passage section) 8b, is arranged to be the bubbling section, a component for connecting the first tube (the first passage section) 8a and the second tube (the second passage section) 8b serves also as the bubbling section. Thus, it is possible to reduce the number of components.

Yet further, in the washer liquid supply system 1A, the connecting member 30A, which is the bubbling section, is provided with the throttle section 32c and the diameter-expanding portion 32d. Thus, it is possible to generate bubbles in the washer liquid W and agitate it, with a simple structure.

Still further, in the washer liquid supply system 1A, as the first tube 8a and the second tube 8b are fit-engaged with the connecting member 30A, the component for connecting the first tube 8a and the second tube 8b can also serve as the bubbling section. Thus, it is possible to reduce the number of components and simplify the structure.

Further, in the washer liquid supply system 1A, as the passage center line X1 of the inlet passage section 31 and the passage center line X2 of the connecting passage section 32 intersect with each other, it is possible to turn the flow of the washer liquid W into a swirl flow at the diameter-shrinking portion 32b, which is on the upstream side of the throttle section 32c, and thereby efficiently generate bubbles.

Still further, in the washer liquid supply system 1A, as the passage center line X3 of the discharge passage section 33 and the passage center line X2 of the connecting passage section 32 are arranged colinearly, it is possible to realize downsizing and simple forming of the connecting member 30A. Further, in the washer liquid supply system 1A, as the angles of the first fit-engagement section 34 and the second fit-engagement section 35 are different, the respective fit-engagement sections 34 and 35 can be easily distinguished from each other, and mistake (reversely attaching or the like) in attaching these to the respective tubes (passage sections) 8a and 8b can be pretended.

Yet further, in the washer liquid supply system 1A, as the delivering amount of the washer liquid W by the pump 2 can be temporarily increased, by quickly raising the liquid surface of the washer liquid W in the heat-retaining tank 20A, it is possible to reduce a delay in supply of the washer liquid W to the window shield C1. In other words, even with a structure including the heat-retaining tank 20A, the washer liquid supply system 1A can quickly supply the washer liquid W to the window shield C1.

Further, in the washer liquid supply system 1A, as the increase amount of the delivering amount is set, based on a detection result from the liquid-amount detecting section 26A, it is possible to appropriately set the increase amount so as to prevent an excess of the supply amount of the washer liquid W supplied from the supply section 6A to the window shield C1.

Still further, in the washer liquid supply system 1A, as the liquid-amount detecting section 26A is a level sensor, it is possible to appropriately set the increase amount, based on the liquid surface level of the washer liquid W.

Yet further, in the washer liquid supply system 1A, as the heater 25 is controlled, based on a detection result from the alcohol-concentration detecting section 27, it is possible to prevent the alcohol concentration of the washer liquid W from excessively dropping and the washer liquid W, which has been discharged from the heat-retaining tank 20A, from freezing.

Further, in the washer liquid supply system 1A, as a threshold is used, the heater 25 is stopped before the alcohol concentration of the washer liquid W becomes to the concentration at which the washer liquid W freezes by ambient air so that the washer liquid W can be appropriately prevented from freezing.

Still further, in the washer liquid supply system 1A, as the heating temperature is set, based on the alcohol concentration, for example, in a case that the alcohol concentration of the washer liquid W has been dropping, the target temperature is set low. Thus, while reducing drop of the alcohol concentration, heating by the heater 25 can be performed until just before the moment when the alcohol concentration becomes the concentration at which the washer liquid W may freeze.

Yet further, in the washer liquid supply system 1A, as the alcohol concentration is detected at a position adjacent to the opening 23a of the discharge-side passage section 23, it is possible to appropriately prevent the washer liquid W from freezing even in a case that the washer liquid W does not flow and stagnates between the heat-retaining tank 20A and the supply section 6A.

In addition, the control section 7 may control the delivering section (pump 2) to temporarily increase the delivering amount of the washer liquid W on the basis of the detection result from the alcohol-concentration detecting section 27.

Second Embodiment

Figure 14:
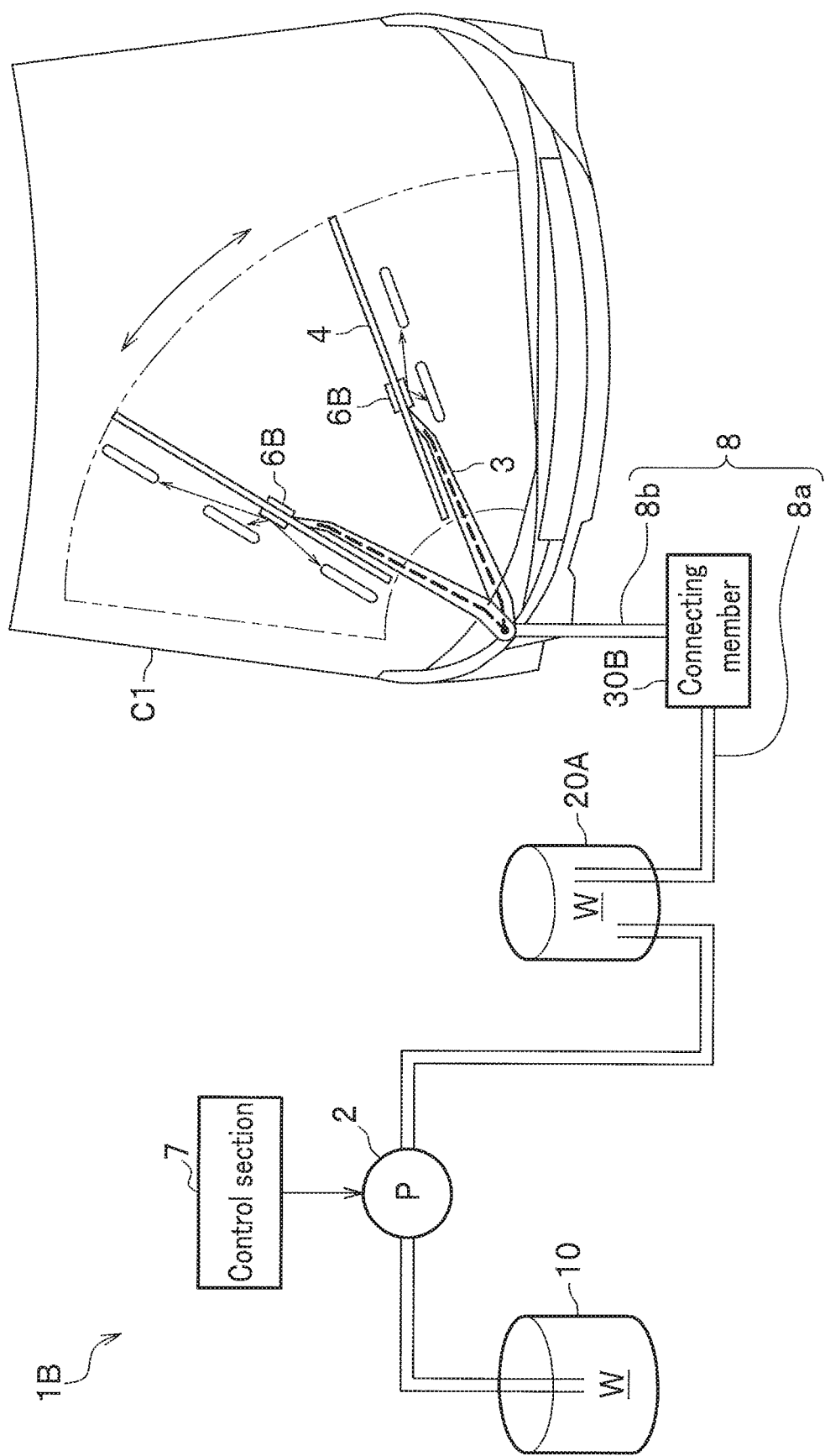
FIG. 14 is a schematic view showing a washer liquid supply system according to a second embodiment of the present invention.

Subsequently, a washer liquid supply system according to a second embodiment of the invention will be described below, focusing on differences from the washer liquid supply system 1A according to the first embodiment. As shown in FIG. 14, a washer liquid supply system 1B according to the second embodiment of the invention is provided with a connecting member 30B and a supply section 6B instead of the connecting member 30A and the supply section 6A. The connecting member 30B is used to connect the first tube 8a and the second tube 8b and does not have a function as a bubbling section that makes the washer liquid W contain bubbles.

Supply Section

Figure 15:
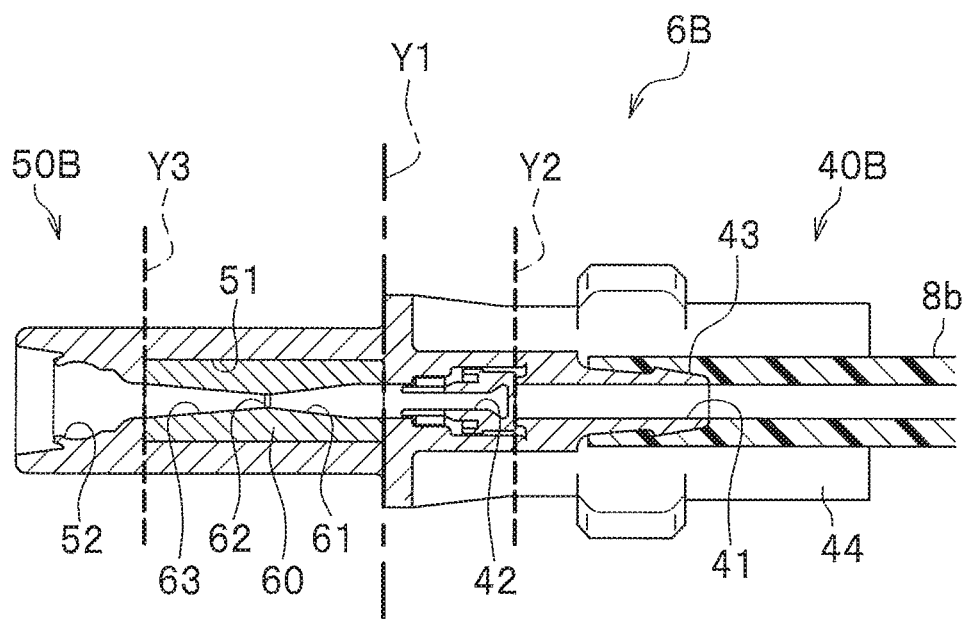
FIG. 15 is a schematic cross-sectional view showing a supply section according to the second embodiment of the present invention.

As shown in FIG. 15, the supply section 6B is provided with a pipe-side member 40B, a nozzle-side member 50B, and a bubbling section 60.

Pipe-Side Member

The pipe-side member 40B is a metal member forming the upstream-side portion of the supply section 6B. The pipe-side member 40B is provided with a passage section 41 allowing the washer liquid W to flow through. The passage section 41 is provided with a check valve 42.

The check valve 42 is a one-way valve for preventing backflow of the washer liquid W. In other words, the check valve 42 allows the washer liquid W to flow from the passage section 8 to the nozzle-side member 50B, and also prevents the washer liquid W from flowing from the nozzle-side member 50B to the passage section 8 (backward flow). The upstream-side end portion of the pipe-side member 40B is arranged as a fit-engagement section 43 with which the second tube 8b of the passage section 8 is fit-engaged (outer fitting). Further, the pipe-side member 40B is provided with a fitting section 44 for fitting the supply section 6B to another unit (the wiper arm 3, the wiper blade 4, or the like).

Nozzle-Side Member

The nozzle-side member 50B is a hollow cylindrical shaped metal member, which forms the downstream-side portion of the supply section 6B. The nozzle-side member 50B is provided with a housing section 51 and a nozzle 52. The housing section 51 houses the bubbling section 60. The nozzle 52 is arranged at the downstream-side end portion of the nozzle-side member 50B, and ejects the washer liquid W, which has flowed through the bubbling section 60, onto the window shield C1.

Bubbling Section

The bubbling section 60 is provided integrally with the supply section 6B to make the washer liquid W contain bubbles. In the present embodiment, the bubbling section 60 is built-in the nozzle-side member 50B. That is, the bubbling section 60 is arranged on a coupling plane Y1 between the pipe-side member 40B and the nozzle-side member 50B, and in more detail, between the nozzle 52 and the coupling plane Y1, which is between the pipe-side member 40B and the nozzle-side member 50B. The bubbling section 60 is provided with a diameter-shrinking portion 61 whose diameter and the passage cross-sectional area become smaller as the point on the cross-section goes from the upstream side toward the downstream side, a throttle section 62, and a diameter-expanding portion 63 whose diameter and the passage cross-sectional area become larger as the point on the cross-section goes toward the downstream side. The passage cross-sectional area of the downstream-side end portion of the shrinking portion 61 and the passage cross-sectional area of the upstream-side end portion of the diameter-expanding portion 63 are equal to the passage cross-sectional area of the throttle section 62. The relations between the passage cross-sectional area and the passage length of the shrinking portion 61, the throttle section 62, and the diameter-expanding portion 63 may be similar to the relations between the passage cross-sectional area and the passage length of the diameter-shrinking portion 32b, the throttle section 32c, and the diameter-expanding portion 32d of the connecting member 30A. Further, the bubbling section 60 may be provided with, on the upstream side of the shrinking portion 61, a large diameter portion similar to the large diameter portion 32a, and/or provided with, on the downstream side of the diameter-expanding portion 63, a small diameter portion similar to the mall diameter portion 32e.

The coupling plane Y1 is a plane on which the downstream-side end portion of the pipe-side member 40B and the upstream-side end portions, of the nozzle-side member 50B and the bubbling section 60, contact with each other. In other words, the upstream-side end portion of the bubbling section 60 is disposed on the same plane as the upstream-side end portion of the nozzle-side member 50B on the coupling plane Y1, and is in contact with the downstream-side end portion of the pipe-side member 40B on the coupling plane Y1. A coupling plane Y2 is a plane on which the pipe-side member 40B and the upstream-side end portion of the check valve 42 contact with each other. A coupling plane Y3 is a plane on which the nozzle-side member 50B and the downstream-side end portion of the bubbling section 60 contact with each other.

Generation of Bubbles in Nozzle-side Member

In the nozzle-side member 50B, the throttle section 62 increases the flow velocity of the washer liquid W, and thereby decreases the liquid pressure to deposit air dissolved in the liquid and thus generate bubbles in the washer liquid W. The diameter-expanding portion 63 decreases the flow velocity of the washer liquid W and thereby increases the liquid pressure to agitate the washer liquid W, making the bubbles in the washer liquid W be micro bubbles.

As the washer liquid supply system 1B according to the second embodiment of the invention can make the washer liquid W contain bubbles immediately before supplying the washer liquid W, it is thereby possible to suppress vanishing of bubbles during delivering the washer liquid W and appropriately exercise a washing capacity.

Further, in the washer liquid supply system 1B, as the bubbling section 60 is arranged on the coupling plane Y1 between the pipe-side member 40B and the nozzle-side member 50B, the bubbling section 60 can be formed as a separate component to improve the productivity.

Still further, in the washer liquid supply system 1B, as the bubbling section 60 is arranged on the coupling plane Y1, the fitting workability can be improved.

Further, in the washer liquid supply system 1B, the bubbling section 60 is built in the nozzle-side member 50B, and the check valve 42 is built in the pipe-side member 40B. Accordingly, for the washer liquid supply system 1A, after the bubbling section 60 and the check valve 42 are attached to respective separate members, the pipe-side member 40B and the nozzle-side member 50B can be attached so that the attaching work can be improved.

Still further, in the washer liquid supply system 1B, as the supply section 6B is arranged on the wiper arm 3 or the wiper blade 4, it is possible to shorten the distance from a position where bubbles are generated to the window shield C1, and thereby reduce vanishing of bubbles.

Yet further, in the washer liquid supply system 1B, as the heat-retaining tank 20A is arranged on the upstream side with respect to the bubbling section 60, it is possible to increase the amount of generating the bubbles and improve the washing capacity, by making the heated washer liquid W contain bubbles.

Third Embodiment

Figure 16:
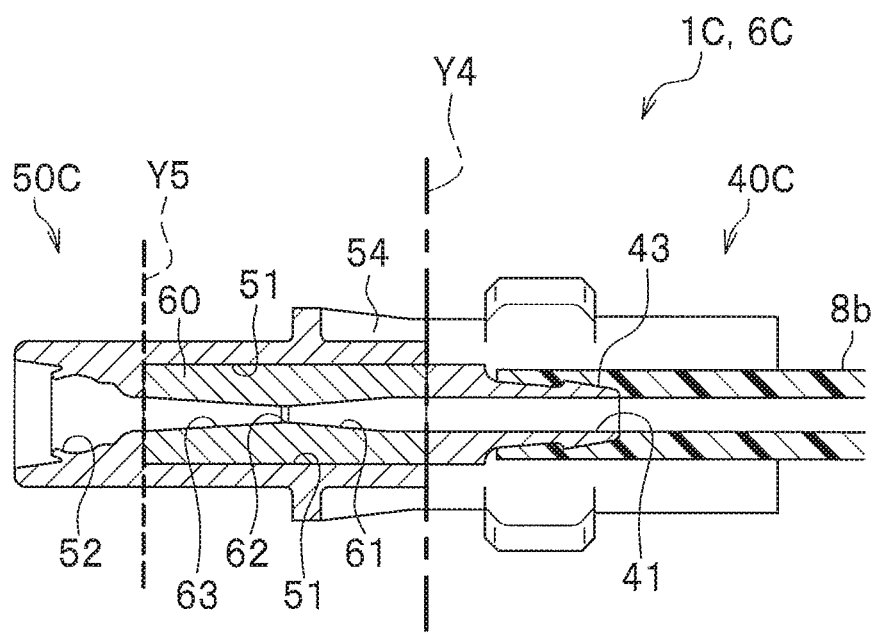
FIG. 16 is a schematic cross-sectional view showing a supply section according to a third embodiment of the present invention.

Subsequently, a washer liquid supply system according to a third embodiment of the invention will be described below, focusing on differences from the washer liquid supply system 1B according to the second embodiment. As shown in FIG. 16, a washer liquid supply system 1C according to the third embodiment of the invention is provided with a supply section 6C instead of the supply section 6B.

Supply Section

The supply section 6C is provided with a pipe-side member 40C and a nozzle-side member 50C instead of the pipe-side member 40B and the nozzle-side member 50B.

Pipe-Side Member

The pipe-side member 40C is not provided with a check valve 42 nor a fitting section 44.

Nozzle-Side Member

The nozzle-side member 50C is provided with a fitting section 54 for fitting the supply section 6C to other units (the wiper arm 3, the wiper blade 4, or the like).

Herein, a coupling plane Y4 is a plane on which the downstream-side end portion of the pipe-side member 40C, and the upstream-side end portions of the nozzle-side member 50C and the bubbling section 60, contact with each other. In other words, the upstream-side end portion of the bubbling section 60 is disposed on the same plane as the upstream-side end portion of the nozzle-side member 50C on the coupling plane Y4, and is in contact with the downstream-side end portion of the pipe-side member 40C on the coupling plane Y4. A coupling plane Y5 is a plane on which the nozzle-side member 50C and the downstream-side end portion of the bubbling section 60 contact with each other.

In addition to preventing back flow by the check valve 42, the supply section 6C according to the third embodiment of the invention has an effect similar to the supply section 6B according to the second embodiment.

Fourth Embodiment

Figure 17:
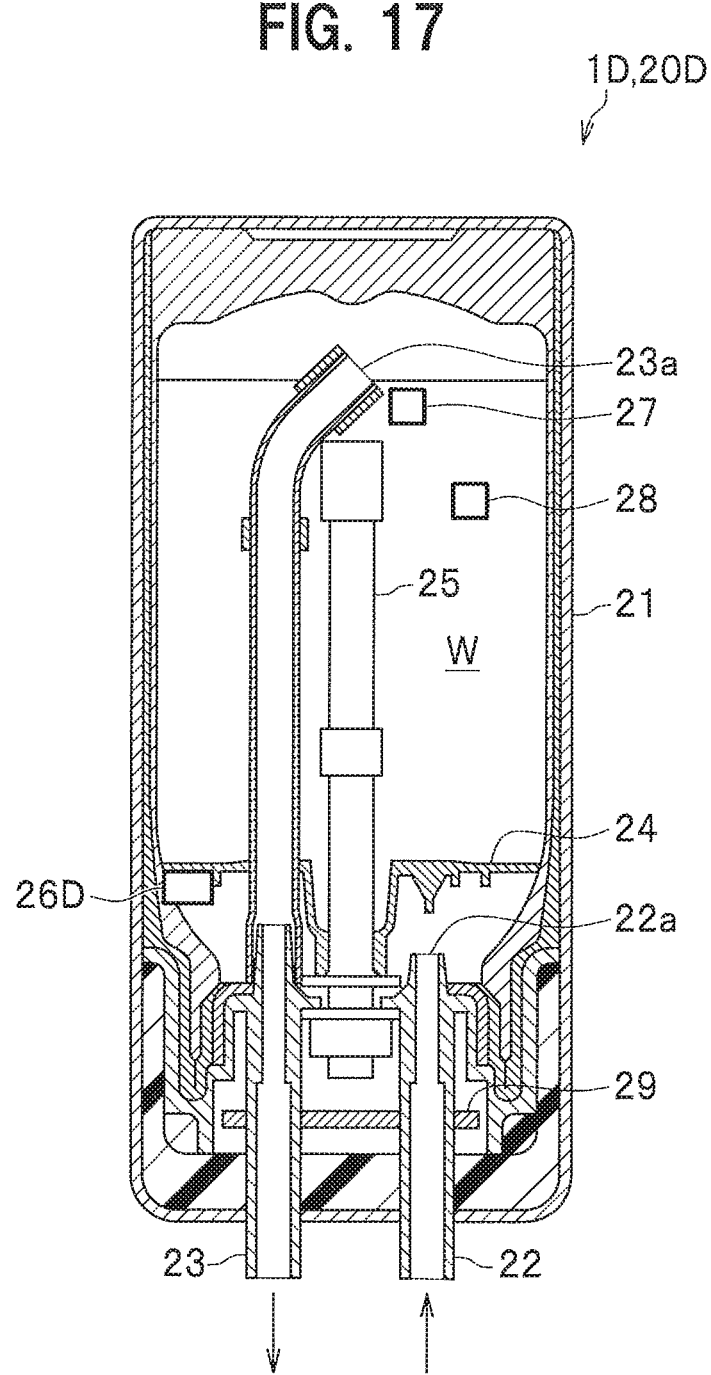
FIG. 17 is a schematic cross-sectional view showing a keep-warm tank according to a fourth embodiment of the present invention.

Subsequently, a washer liquid supply system according to a fourth embodiment of the present invention will be described, focusing on differences from the washer liquid supply system 1A according to the first embodiment. As shown in FIG. 17, a washer liquid supply system 1D according to the fourth embodiment of the invention is provided with a heat-retaining tank 20D instead of the heat-retaining tank 20A.

Heat-retaining Tank and Liquid Amount Detecting Section

The heat-retaining tank 20D is provided with a liquid-amount detecting section 26D instead of the liquid-amount detecting section 26A. The liquid-amount detecting section 26D is a weight sensor for detecting the weight of the washer liquid W temporarily stored in the tank main-body 21. The liquid-amount detecting section 26D outputs a detection result to the control section 7 (see FIG. 2).

The control section 7 stores in advance the relation between the weight of the washer liquid W detected by the liquid-amount detecting section 26D and the level of the liquid surface of the washer liquid W, as a mathematical expression, a table, or the like. The control section 7 uses this relation to convert the weight of the washer liquid W detected by the liquid-amount detecting section 26D into the level of the liquid surface of the washer liquid W.

In more detail, the control section 7 stores in advance the relation between the weight of the washer liquid W detected by the liquid-amount detecting section 26D, the alcohol concentration detected by the alcohol-concentration detecting section 27, and the level of the liquid surface of the washer liquid W as a mathematical expression, a table, or the like. The control section 7 uses this relation to convert the weight of the washer liquid W detected by the liquid-amount detecting section 26D into the level of the liquid surface of the washer liquid W.

In the washer liquid supply system 1D according to the fourth embodiment of the invention, as the liquid-amount detecting section 26A is a weight sensor and the control section 7 converts a weight into a level, it is possible to appropriately set an increase amount, based on the liquid surface level of the washer liquid W.

Further, in the washer liquid supply system 1D, as the deflector 24 disturbs the flow of the washer liquid W, it is possible to inhibit the washer liquid W, which is from the inlet-side passage section 22, from flowing to the discharge-side passage section 23, without being heated.

Still further, in the washer liquid supply system 1D, by the use of the deflector 24, it is possible to detect the weight of the washer liquid W with a simple structure.

Further, in the washer liquid supply system 1D, by the use of a detection result from the alcohol-concentration detecting section 27, it is possible to appropriately obtain the level of the liquid surface of the washer liquid W. Further, in the washer liquid supply system 1D, as the alcohol-concentration detecting section 27 is arranged at a position closer to the opening 23a of the discharge-side passage section 23 than to the opening 22a of the inlet-side passage section 22, it is possible to appropriately detect the alcohol concentration.

Fifth Embodiment

Figure 18:
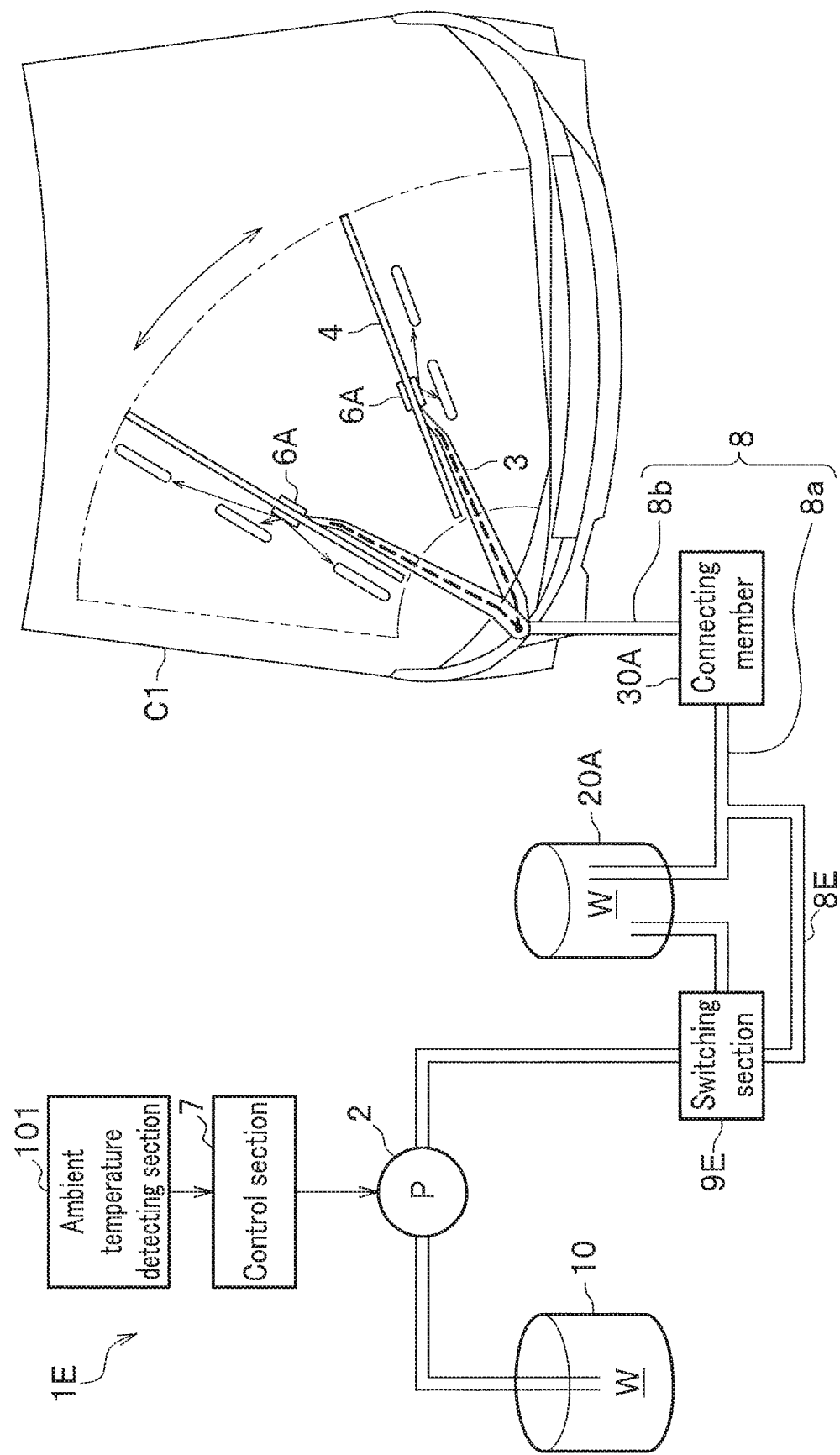
FIG. 18 is a schematic view showing a washer liquid supply system according to a fifth embodiment of the present invention.

Subsequently, a washer liquid supply system according to a fifth embodiment of the invention will be described, focusing on differences from the washer liquid supply system 1A according to the first embodiment. As shown in FIG. 18, a washer liquid supply system 1E according to the fifth embodiment of the invention is provided with a bypass passage section 8E, a switching section 9E, and an ambient temperature detecting section 101.

Bypass Passage Section

The bypass passage section 8E is a passage section that connects a point between the pump 2 and the heat-retaining tank 20A and a point between the heat-retaining tank 20A and the connecting member 30A in such a manner that the washer liquid W can flow therethrough. That is, the bypass passage section 8E bypasses the heat-retaining tank 20A.

Switching Section

The switching section 9E is, in the passage section 8, arranged at a part that connects a point, which is between the pump 2 and the heat-retaining tank 20A, and the bypass passage section 8E. The switching section 9E switches the flow direction of the washer liquid W, based on control by the control section 7. The switching section 9E is provided with a solenoid valve and the like to be able to switch between the following states:

A first state that permits the washer liquid W, which has been delivered from the pump 2, to flow to the heat-retaining tank 20A, and prohibits the washer liquid W from flowing to the bypass passage section 8E;

A second state that permits the washer liquid W, which has been delivered from the pump 2, to flow to the heat-retaining tank 20A, and permits the washer liquid W to flow to the bypass passage section 8E; and A third state that prohibits the washer liquid W, which has been delivered from the pump 2, from flowing to the heat-retaining tank 20A, and permits the washer liquid W to flow to the bypass passage section 8E.

Ambient Temperature Detecting Section

The ambient temperature detecting section 101 is a temperature sensor for detecting the temperature in the surroundings of the vehicle C (see FIG. 1), namely the ambient temperature. The ambient temperature detecting section 101 outputs a detection result to the control section 7.

Control of Switching Section Based on Ambient Temperature

If a detection result from the ambient temperature detecting section 101 is higher than or equal to a preset certain temperature (30° C. degree for example), the control section 7 sets the switching section 9E to the third state.

Control of Switching Section Based on Liquid Amount in Heat-retaining Tank

On the other hand, when a detection result from the ambient temperature detecting section 101 is lower than the above-described certain temperature and when a detection result from the liquid-amount detecting section 26A indicates that the level of the liquid surface of the washer liquid W is lower than the opening 23a of the discharge-side passage section 23, the control section 7 sets the switching section 9E to the second state in an initial stage of supplying the washer liquid W. Further, when a certain time has elapsed after setting the switching section 9E to the second state, the control section 7 sets the switching section 9E to the first state.

The control section 7 may be arranged such as to make the output of the pump 2, which is output during when the switching section 9E is set to the second state, larger than the output of the pump 2, which is output during when the switching section 9E is set to the first state.

Further, when a detection result from the ambient temperature detecting section 101 is lower than the above-described certain temperature and if a detection result from the liquid-amount detecting section 26A indicates that the level of the liquid surface of the washer liquid W is higher than or equal to the height of the opening 23a of the discharge-side passage section 23, the control section 7 sets the switching section 9E to the first state during supplying the washer liquid W.

Herein, the lower level of the liquid surface of the washer liquid W from the opening 23a of the discharge-side passage section 23 is, the longer the control section 7 can set the time of setting the switching section 9E to the second state.

Heating Control Corresponding to Alcohol Concentration

The lower the ambient temperature detected by the ambient temperature detecting section 101 is, the higher the control section 7 sets the threshold (see FIG. 13).

In the washer liquid supply system 1E according to the fifth embodiment of the present invention, the washer liquid W temporarily flows through both the heat-retaining tank 20A and the bypass passage section 8E. Accordingly, even in a state that a delay in supplying the washer liquid W to the window shield C1 could occur, the delay in supplying the washer liquid W can be prevented by the use of the bypass passage section 8E. That is, the washer liquid supply system 1E can quickly supply the washer liquid W to the window shield C1 even in a structure including the heat-retaining tank 20A.

Further, by utilizing a detection result from the liquid-amount detecting section 26A, in a state that a delay in supplying the washer liquid W could occur, the washer liquid supply system 1E can prevent a delay in supplying the washer liquid W, by the use of the bypass passage section 8E; and in a state that a delay in supplying the washer liquid W does not occur, the washer liquid supply system 1E can appropriately exercise the washing capacity, by supplying the washer liquid W having been heated.

If the ambient temperature is high, the washer liquid supply system 1E can prevent a delay in supplying the washer liquid W, by using the bypass passage section 8E, and can appropriately exercise a washing capacity, by supplying the washer liquid W at a comparatively high temperature.

Further, as the washer liquid supply system 1E changes the threshold, corresponding to the ambient temperature, if the ambient temperature is low, the washer liquid supply system 1E sets the threshold high to maintain the alcohol concentration high so that the washer liquid W can be appropriately prevented from freezing. If the ambient temperature is high, the washer liquid supply system 1E sets the threshold low so that, even in a case of a comparatively low alcohol concentration, the washer liquid supply system 1E continues to heat the washer liquid W by the heater 25 so that the washing capacity by the washer liquid W can be appropriately exercised.

Sixth Embodiment

Figure 19:
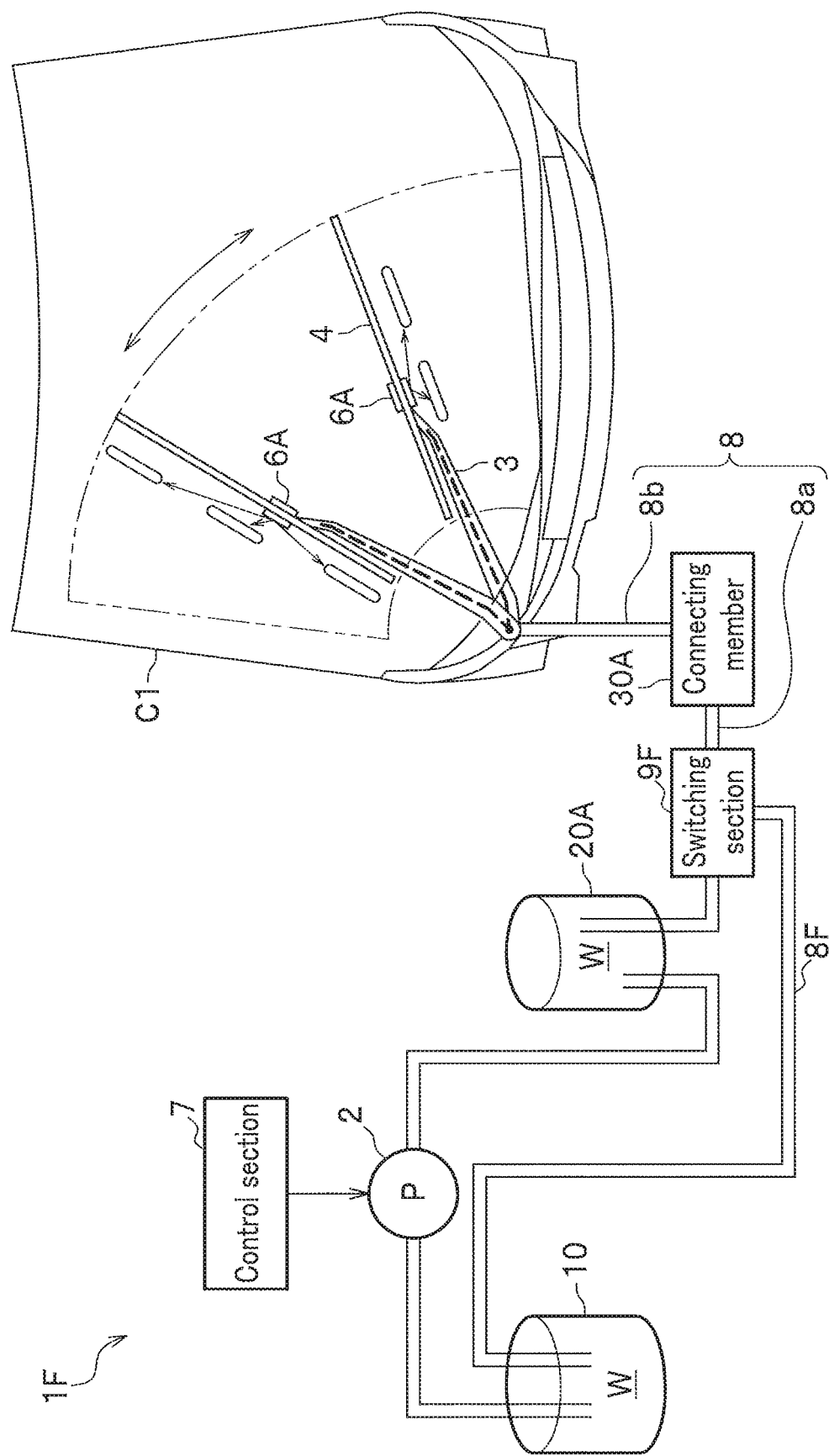
FIG. 19 is a schematic view showing a washer liquid supply system according to a sixth embodiment of the present invention.

Subsequently, a washer liquid supply system according to a sixth embodiment of the present invention will be described below, focusing on differences from the washer liquid supply system 1A according to the first embodiment. As shown in FIG. 19, a washer liquid supply system 1F according to the sixth embodiment of the invention is provided with a return passage section 8F and a switching section 9F.

Return Passage Section

The return passage section 8F is a passage section, of a passage section 8, that connects a point between the heat-retaining tank 20A and the supply section 6A (the connecting member 30A in the present embodiment), and the washer tank 10, such that the washer liquid W can flow therethrough. That is, the return passage section 8F returns the washer liquid W, which has been discharged from the heat-retaining tank 20A, back to the washer tank 10.

Switching Section

The switching section 9F is arranged at a connecting part connecting a point, which is between the heat-retaining tank 20A of the passage section 8 and the supply section 6A (the connecting member 30A in the present embodiment), and the return passage section 8F, and switches the flow direction of the washer liquid W, based on control by the control section 7. The switching section 9F includes a solenoid valve and the like to be able to switch the following states:

A first state that permits the washer liquid W from the heat-retaining tank 20A to flow to the supply section 6A, and prohibits the washer liquid W from flowing to the return passage section 8F; and A second state that prohibits the washer liquid W, which has been delivered from the heat-retaining tank 20A, from flowing to the supply section 6A, and permits the washer liquid W to flow to the return passage section 8F.

Control of Switching Section, Based on Alcohol Concentration

If alcohol concentration detected by the alcohol-concentration detecting section 27 is lower than or equal to the threshold, the control section 7 drives the pump 2 and makes the switching section 9F to the second state. In this state, the washer liquid W with a dropped alcohol concentration in the tank main-body 21 of the heat-retaining tank 20A is returned, by the pump 2, through the switching section 9F and the return passage section 8F to the washer tank 10. The washer liquid W, with a comparatively high alcohol concentration, in the washer tank 10 is delivered by the pump 2 into the tank main-body 21 of the heat-retaining tank 20A.

As the washer liquid supply system 1F according to the sixth embodiment of the present invention replaces the washer liquid W in the heat-retaining tank 20A if the alcohol concentration has dropped, it is possible to prevent the washer liquid W, whose alcohol concentration has dropped, from being delivered to the supply section 6A.

Embodiments of the present invention have been described above, however, the invention is not limited thereto, and can be changed and modified, as appropriate, within a range without departing from the spirit of the invention. For example, an object to be supplied with the washer liquid W is not limited to the window shield C1 and may be, for example, a cover of a headlight of the vehicle C. Further, the washer liquid supply systems 1A to 1F according to the respective embodiments can be combined, as appropriate.

Further, in the connecting member 30A, the method of making the washer liquid W contains bubbles is not limited to the above described.

Still further, the method of making the washer liquid W contain bubbles in the bubbling section 60 is not limited to the above-described. For example, a washer liquid supply system may be provided with a compressor mounted on the vehicle C so that the bubbling section 60 mixes air, which has been compressed by this compressor, with the washer liquid W to thereby make the washer liquid W contain bubbles.

Yet further, the shapes of the coupling planes Y1 and Y4 are not limited to be a linear shape in a side view.

Further, arrangement may be made such that a check valve is built in a nozzle-side member, and a bubbling section is built in a pipe-side member.

Still further, the washer liquid supply system 1D may be provided with an inclination detecting section for detecting the inclination of the vehicle C. With this structure, by further using a detection result from the inclination detecting section, the control section 7 can determine whether the level of the liquid surface of the washer liquid W is at a height that is higher than or equal to the opening 23a of the discharge-side passage section 23. Further, the control of the increase of the initial discharge amount can be applied, not only to the above-described heat-retaining tank 20A and heat-retaining tank 20D, but also to a heat-retaining tank having a structure which may generate a delay in discharge, for example, a structure in which the inside of the tank main-body 21 has a plural-chamber structure or a structure in which a reserve chamber is provided between the inlet-side passage section 22 and the discharge-side passage section 23.

Further, the heat-retaining tanks 20A and 20D may have a structure without the control board 29. In this structure, a different control section 7 or the like provided on the vehicle C can control the heater 25.

What is claimed is:

1. A washer liquid supply system, comprising:
a washer tank mounted on a vehicle to store washer liquid;
a supply section mounted on the vehicle to supply the washer liquid in the washer tank to an object of the vehicle;
a heat-retaining tank mounted on the vehicle and disposed between the washer tank and the supply section to temporarily store the washer liquid supplied from the washer tank to the supply section;
a delivering section mounted on the vehicle to deliver the washer liquid stored in the washer tank to the supply section through the heat-retaining tank; and
a control section that controls the delivering section,
wherein the heat-retaining tank includes a liquid-amount detecting section detecting a liquid amount of the washer liquid in the heat-retaining tank;
wherein the control section controls the delivering section to temporarily increase a delivering amount of the washer liquid at an initial time of supplying the washer liquid, and sets an increase amount of the delivering amount for temporarily increasing the liquid amount of the washer liquid in the heat-retaining tank on the basis of the detection result of the liquid-amount detecting section.

2. The washer liquid supply system according to claim 1, wherein the liquid-amount detecting section comprises a level sensor that detects a surface of the washer liquid in the heat-retaining tank.

3. The washer liquid supply system according to claim 1, wherein the liquid-amount detecting section comprises a weight sensor that detects a weight of the washer liquid in the heat-retaining tank.

4. The washer liquid supply system according to claim 3, wherein the heat-retaining tank includes:
a tank main body that temporarily stores the washer liquid;
a discharge-side passage section that has an opening above a bottom surface of the tank main body and discharge the washer liquid in the tank main body to a side of the supply section;
an inlet-side passage section that has an opening at a position lower than the opening of the discharge-side passage section and lets the washer liquid flow into the tank main-body; and
a deflector disposed at a height between a position of the opening of the inlet-side passage section and the opening of the discharge-side passage section,
wherein the weight sensor detects weight of the washer liquid acting the deflector.

5. The washer liquid supply system according to claim 1, further comprising:
an alcohol-concentration detecting section that detects an alcohol concentration of the washer liquid in the heat-retaining tank,
wherein the control section controls the delivering section to temporarily increase a delivering amount of the washer liquid on the basis of a detection result from the alcohol-concentration detecting section.

6. The washer liquid supply system according to claim 5, wherein the heat-retaining tank includes:
a tank main body that temporarily stores the washer liquid;
a discharge-side passage section that has an opening above a bottom surface of the tank main body and discharge the washer liquid in the tank main body to a side of the supply section;
an inlet-side passage section that has an opening at a position lower than the opening of the discharge-side passage section and lets the washer liquid flow into the tank main-body, wherein the an alcohol-concentration detecting section detects an alcohol concentration at a position closer to the opening of the a discharge-side passage section than the opening of the inlet-side passage section.

7. A washer liquid supply system, comprising:

a washer tank mounted on a vehicle to store washer liquid;

a supply section mounted on the vehicle to supply the washer liquid in the washer tank to an object of the vehicle;

a heat-retaining tank mounted on the vehicle and disposed between the washer tank and the supply section to temporally store the washer liquid supplied from the washer tank to the supply section;

a bypass passage section allowing the washer liquid in the washer tank to flow to the supply section bypassing the heat-retaining tank;

a switching section that switches a flow direction of the washer liquid between the het heat-retaining tank and the bypass passage;

a control section that controls the switching section wherein the control section controls the switching section to allow the washer liquid temporarily flows at an initial time of supplying the washer liquid through both the heat-retaining tank and the bypass passage section.

8. The washer liquid supply system according to claim 7, comprising:

wherein the heat-retaining tank includes:

a tank main body that temporarily stores the washer liquid;

a discharge-side passage section that has an opening above a bottom surface of the tank main body and discharge the washer liquid in the tank main body to a side of the supply section;

a liquid-amount detecting section detecting the liquid amount of the washer liquid in the tank main body;

wherein the heat-retaining tank includes:

the control section controls the switching section based on the detection result of the liquid-amount detecting section to allow the washer liquid to temporarily flow through both the heat-retaining tank and the bypass passage at an initial time of supplying the washer liquid when the liquid surface level of the washer liquid is lower than the height of the opening of the discharge-side passage section.

9. The washer liquid supply system according to claim 7 further comprising an ambient temperature detecting section that detects an ambient temperature, wherein the control section controls the switching section to:

prohibit the washer liquid from flowing into the heat-retaining tank and allow the washer liquid to flow to the bypass passage section when the ambient temperature is higher than or equal to a preset certain temperature, and allow the washer liquid to flow into the heat-retaining tank and prohibit the washer liquid from flowing through the bypass passage section when the ambient temperature is lower than the preset certain temperature.

* * * * *